United States Patent [19]

Koyanagi

[11] Patent Number: 4,708,167
[45] Date of Patent: Nov. 24, 1987

[54] CHECK VALVE

[76] Inventor: Toshimichi Koyanagi, 1-11-3, Taiheiji, Kashihara-shi, Osaka-fu, Japan

[21] Appl. No.: 936,304

[22] Filed: Dec. 1, 1986

[30] Foreign Application Priority Data

Dec. 4, 1985 [JP] Japan .................. 60-187389[U]

[51] Int. Cl.⁴ ............................................. F16K 15/16
[52] U.S. Cl. .............................. 137/512.15; 137/512.4; 137/844; 137/846
[58] Field of Search ............... 137/512.15, 512.4, 844, 137/843, 846; 446/224

[56] References Cited

U.S. PATENT DOCUMENTS

| Re. 682 | 4/1859 | Peale | 137/844 |
| 279,451 | 6/1883 | Sinclair | 137/846 |
| 2,922,437 | 1/1960 | Rippingille | 137/844 |
| 3,822,720 | 7/1974 | Souza | 137/846 |

Primary Examiner—Robert G. Nilson
Attorney, Agent, or Firm—Larson & Taylor

[57] ABSTRACT

A check valve comprising a fluid pipe of a plastic film formed in a flat shape, and at least one valve body of a rectangular plastic film disposed in said fluid pipe, said valve body being bonded at the longitudinal edges thereof to the longitudinal edges of said fluid pipe, the tip end of said valve body in the fluid flowing direction being bonded to the inner side of one of the upper and lower flat surfaces of said fluid pipe to form a closed portion and an open portion, the base end of said valve body being not bonded to said fluid pipe to form openings between said valve body and the flat upper and lower surfaces of said fluid pipe, whereby a fluid can flow in a gap between one of said openings at the base end of said valve body and said open portion at the tip end thereof.

10 Claims, 15 Drawing Figures

ic film or rubber, a fluid such as gas or a liquid is conventionally sealed hermetically with the following means. That is, a tube of a predetermined length extending from the main body of a water bag or a balloon toy, may be bound at its projecting portion after the main body has been filled with a fluid through the tube, thereby to prevent the fluid from leaking from the main body. There is also used a check valve mounted on a passage port of the main body. The sealing action of the check valve prevents a fluid introduced in the main body from leaking therefrom.

The former means not only requires a troublesome tube binding operation, but also presents the defect that a portion of the fluid introduced in the main body easily leaks during the tube binding operation. The latter means presents the defects that the valve itself has a very complicated structure, and requires special structural members and much labor for attaching the valve, resulting in expensive costs. Moreover, such valve may be easily damaged during the use, thereby to lower or lose the sealing function as a check valve.

SUMMARY OF THE INVENTION

The present invention relates to a check valve, and more particularly to improvements in a check valve to be used for an article such as a balloon toy or a water bag which is filled air-tight with a fluid such as air or a liquid.

It is a main object of the present invention to provide an economical check valve having a very simple structure capable of securely preventing a leak of a fluid introduced in a balloon toy or a water bag and assuring a smooth charge/discharge of a fluid, so that the check valve of the present invention is less troubled and can be easily manufactured.

The check valve in accordance with the present invention comprises at least one valve body of a rectangular plastic film disposed in a fluid pipe of a plastic film formed in a flat shape. The valve body is bonded, at the longitudinal edges, to the longitudinal edges of the fluid pipe. The edge of the tip end of the valve body is bonded to the inner side of either flat surface of the fluid pipe to form a closed portion and an open portion. The edge of the base end of the valve body is not bonded to the fluid pipe to form openings between the valve body and the flat surfaces of the fluid pipe. A fluid can flow in a gap between one of the openings at the base end of the valve body and the open portion at the tip end of the valve body.

The check valve in accordance with the present invention may be used for a balloon toy for example. When a fluid is supplied into the fluid pipe, the fluid smoothly flows in a gap communicating with one of the openings at the base end of the valve body and the open portion at the tip end of the valve body. Then, the fluid enters the inside of the balloon toy on which the check valve is mounted. The fluid once introduced in the balloon toy tends to flow out due to its pressure. However, the valve body has at its tip a closed portion which forms a dead end. The pressure of the fluid presses the valve body. Therefore, the gap passage, particularly in the vicinity of the base end of the valve body, is closed to prevent the fluid from flowing out.

The fluid introduced in the balloon toy may be smoothly discharged by opening the closed gap with a slender rod inserted therein from the open portion at the tip side.

In accordance with the check valve of the present invention, its peculiar structure together with the resiliency of a thin material used may provide a secure non-return effect to prevent a fluid leak perfectly.

Moreover, the check valve of the present invention do not have a complicated structure as in a conventional check valve, thus eliminating a possibility of troubles occurring. A fluid sealing effect can therefore be assured for a long period of time.

According to the present invention, a plurality of valve bodies are disposed in series in the fluid pipe to prevent, in multiple stages, a fluid once introduced from leaking outside. Thus, the sealing effect is further improved.

BRIEF DESCRIPTION OF THE DRAWINGS

FIG. 7 (A) and FIG. 7 (B) are views illustrating how the check valve through which a fluid is introduced, with FIG. 7 (B) being an enlarged section view of the check valve in a closed position.

FIG. 12 (A), FIG. 12 (B), FIG. 12 (C) schematically illustrate how the valve bodies are arranged in the respective embodiments.

DETAILED DESCRIPTION OF THE PREFERRED EMBODIMENTS

Figure 5:
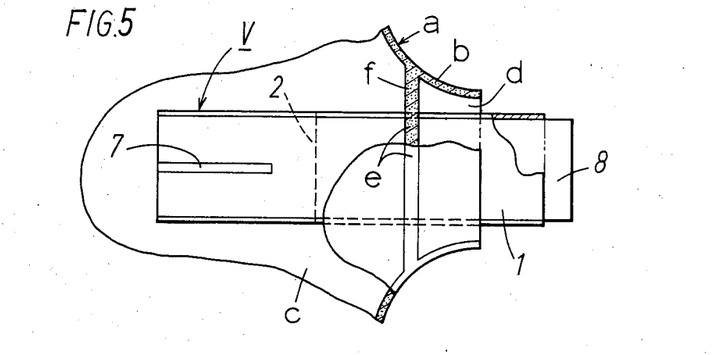
FIG. 5 is an enlarged view with portions broken away of the main portions in FIG. 4.
Figure 6:
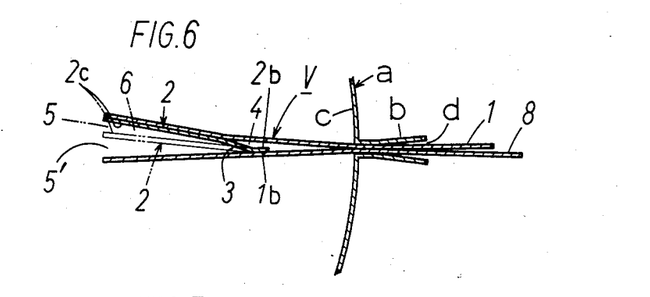
FIG. 6 is a view illustrating how the check valve effects a closing operation.

In the embodiment shown in FIGS. 1 to 7, the check valve V in accordance with the present invention comprises a fluid pipe 1 of predetermined width and length formed into a flat shape and made of a soft and thin plastic film such as a polyethylene film, and a valve body 2 disposed in the fluid pipe 1 and made of a square plastic film which is the same material as that of the fluid pipe 1. The valve body 2 is bonded, at the longitudinal edges 2a, to the longitudinal edges 1a of the fluid pipe 1. As shown in FIG. 6, the valve body 2 is bonded, at the edge 2b of the tip end thereof in the fluid flowing direction, to the inner side 1b of a flat surface of the fluid pipe 1 which is the lower flat surface in FIG. 6. Thus, there are formed a closed portion 3 and an open portion 4. Except its both edges, a base end 2c of the valve body 2 is not bonded to the fluid pipe 1. There are formed openings 5 and 5' between the both flat surfaces of the fluid pipe 1 and the valve body 2. Thus, a fluid is allowed to flow in a gap 6 between the open portion 4 at the tip side and one of the openings 5 at the base side of the valve body.

In order to further assure the prevention of a fluid leak, the check valve V has a bonding portion 7 at which the inner side of the upper flat surface of the fluid pipe 1 is partially bonded to the upper side of the valve body 2 at one portion. The check valve V also has, at the fluid inlet/outlet port of the fluid pipe 1, a projecting guide tongue 8 with the use of which fluid charge/discharge means is inserted. The guide tongue 8 is disposed for facilitating the charge/discharge of a fluid.

Figure 1:
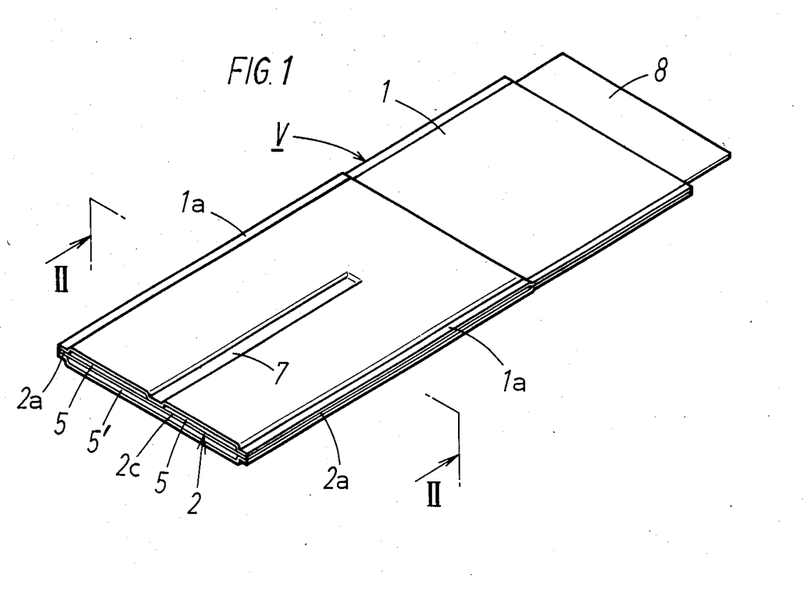
FIG. 1 is a perspective view of check valve in accordance with a first embodiment of the present invention.
Figure 2:
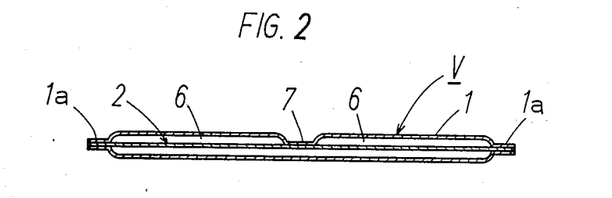
FIG. 2 is an enlarged section view taken along the line II—II of FIG. 1.
Figure 3:
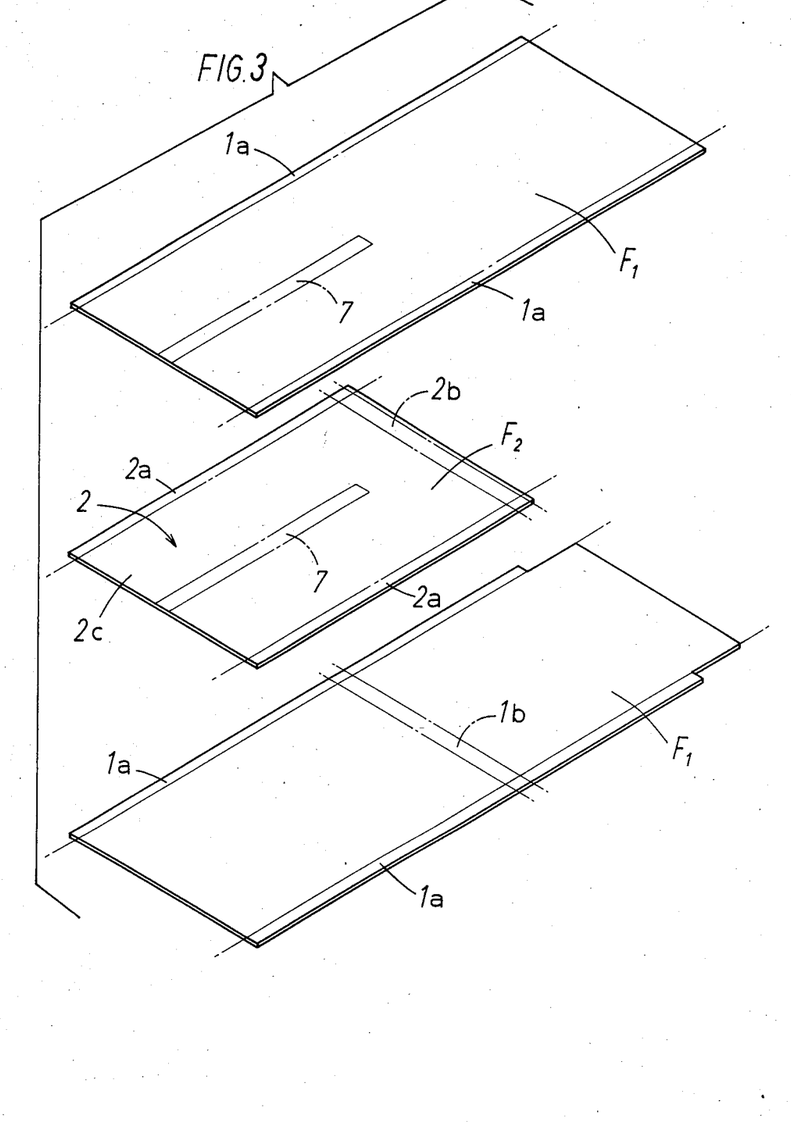
FIG. 3 is an exploded perspective view of the check valve of FIG. 1.
Figure 4:
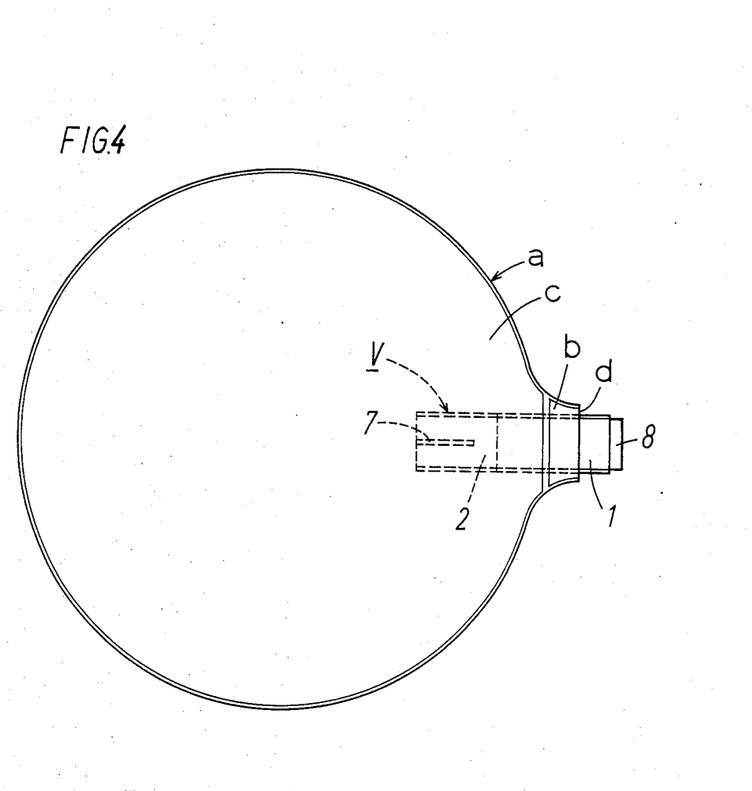
FIG. 4 is a front view illustrating one example of how the check valve of FIG. 1 is used.

FIG. 3 is an exploded view of the check valve V, from which it can be easily understood how the check valve V is made by way of example.

In this example, in order to facilitate the manufacture of the check valve having the structure above-mentioned, the fluid pipe 1 is made of two rectangular plastic films F1 and the valve body 2 is made of one rectangular plastic film F2, the films F1 being longer than the film F2. The film F2 is held by and between the films F1. As mentioned earlier, the both longitudinal edges 1a and 2a of the films F1 and F2 are heatingly bonded to one another, and the edge of the tip end 2b of the valve body is heatingly bonded to the inner surface 1b of one film F1 of the fluid pipe 1. The valve body and the fluid pipe 1 are heatingly bonded at the portions 7 thereof, thus forming a check valve having the structure above-mentioned.

The following description will discuss how the check valve is used and operates with reference to FIGS. 4 to 7(A) and 7 (B).

In FIGS. 4 to 7(A) and 7(B), a flat balloon toy body a is made of two plastic films c of a substantially circular shape each having a lip-like projecting portion b at a portion of the periphery thereof. These films c are bonded to each other at their peripheries, except the tip peripheries of the projecting portion b. The body a has an opening d at a portion of the periphery thereof.

The check valve V can be inserted in the balloon toy body a through the opening d with the valve body mounting side of the check valve V turned to the inside of the balloon toy body a. The tip end of the fluid pipe 1 slightly projects from the projecting portion b of the main body a. As shown in FIG. 5, the outer peripheral surface of the check valve V is heatingly bonded, at one linear portion e thereof, to the inner surface of the opening d of the body a. The remaining inner surfaces of the opening d are heatingly bonded to one another at linear portions f thereof. There is thus formed a balloon toy of which the inside and the outside communicate with each other only through the check valve V.

Figure 7:
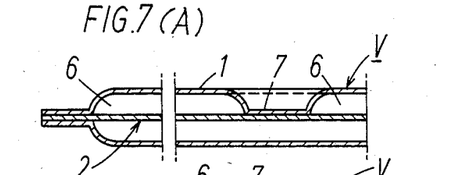
Figures 7, 8:
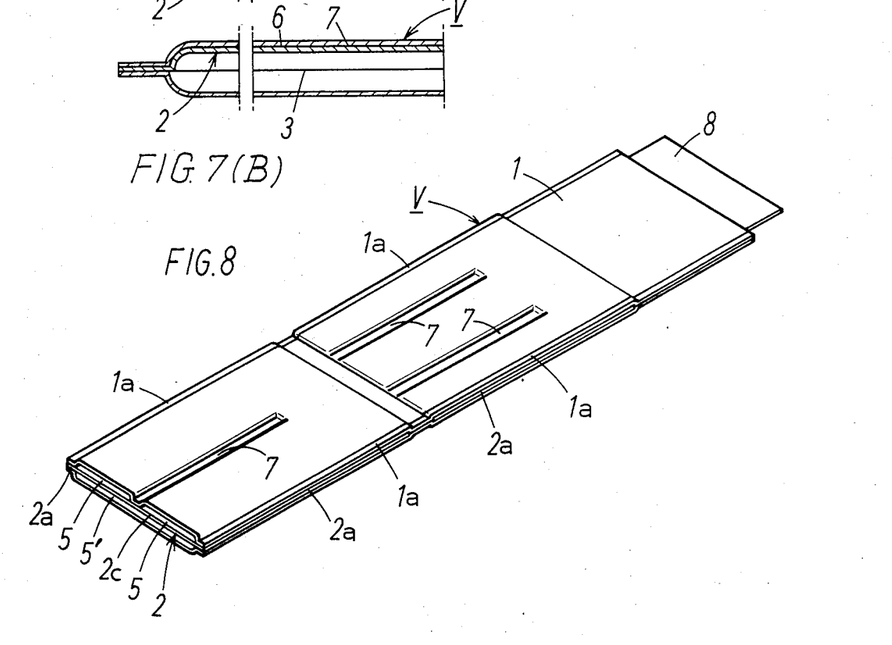
FIG. 8 is a perspective view of a check valve in accordance with a second embodiment of the present invention.

When blowing gas into the balloon toy constructed as above-mentioned, the guide tongue 8 of the fluid pipe 1 of the check valve V can be used. That is, the tip of a supply port of a gas supply means (not shown) can be easily inserted into the fluid pipe 1. When gas is then supplied, the gas is smoothly introduced into the body a through the gaps 6 as shown in FIG. 7 (A). Upon the completion of such gas supply, the gas supply means is removed. Since the valve body 2 has at its tip the closed portion 3 which forms a dead end, the gas once introduced in the balloon toy which tends to flow out, presses the valve body 2 to the inner side of the upper flat surface of the fluid pipe 1 (FIG. 6) by the pressure of the gas. The gaps 6 are therefore closed to prevent the gas from flowing out from the balloon toy, as shown in FIG. 6 and FIG. 7 (B).

For discharging the gas once introduced in the body a, the gaps 6 can be pressingly opened by inserting a slender rod or the like into the gaps 6 from the closed side of the valve body. A smooth discharge of the gas is thus achieved.

Even if the gaps 6 should be insufficiently sealed to allow a portion of gas to leak outside, the pressure of the gas acts on the fluid pipe 1 at its bonded portion e of the outer surface thereof to close tight the fluid pipe 1. Thus, gas leakage can be securely prevented in two stages.

According to this embodiment of the present invention, the inner side of the upper surface of the fluid pipe 1 and the upper surface of the valve body 2 in FIG. 7 (A) are partially bonded to each other to narrow the width of the gaps 6, thereby to further improve the prevention of a fluid leak.

The following description will discuss a second embodiment of the present invention with reference to FIGS. 8 to 11.

In the second embodiment, two valve bodies 2 are disposed in series at a predetermined space interval in one fluid pipe 1. One valve body 2 is partially bonded to the fluid pipe 1 at one bonding portion 7, while the other valve body 2 is partially bonded to the fluid pipe 1 at two bonding portions 7 which are separated from each other in the widthwise direction. Except these two points above-mentioned, the second embodiment is the same in structure as in the first embodiment, That is, the check valve V is formed by disposing two valve bodies 2 in series in the fluid pipe 1 along the fluid flowing direction from the base side of the fluid pipe 1.

Figure 9:
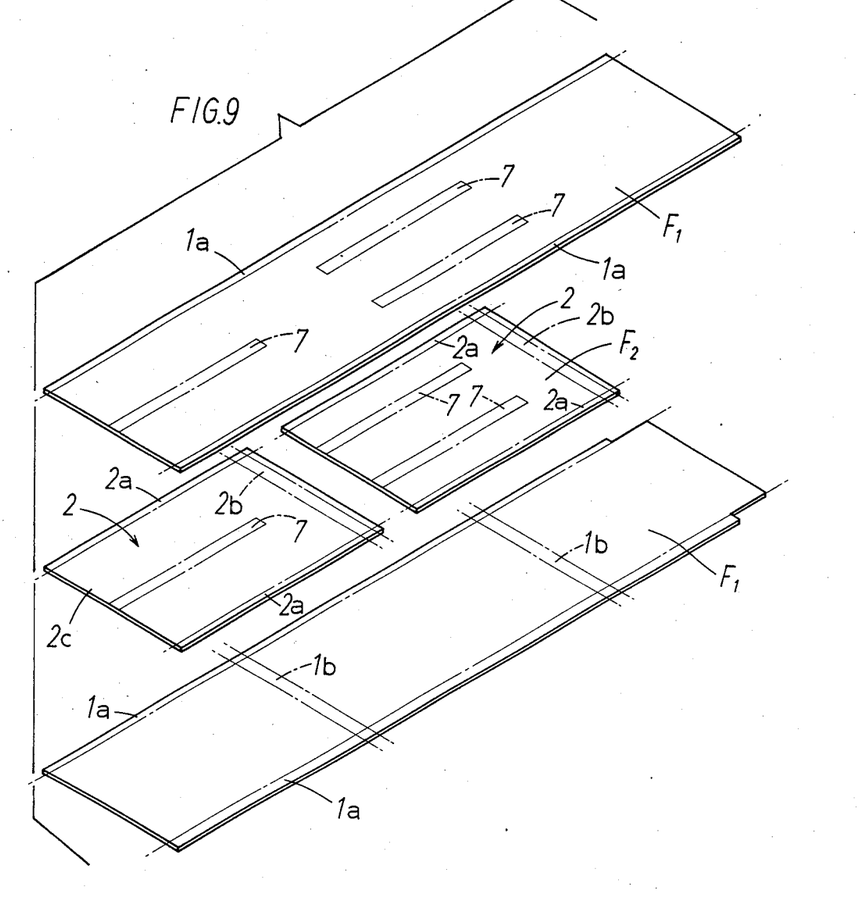
FIG. 9 is an exploded perspective view of the check valve in FIG. 8.

FIG. 9 is an exploded view of the check valve, from which it can be easily understood how the check valve is made by way of example.

Figure 10:
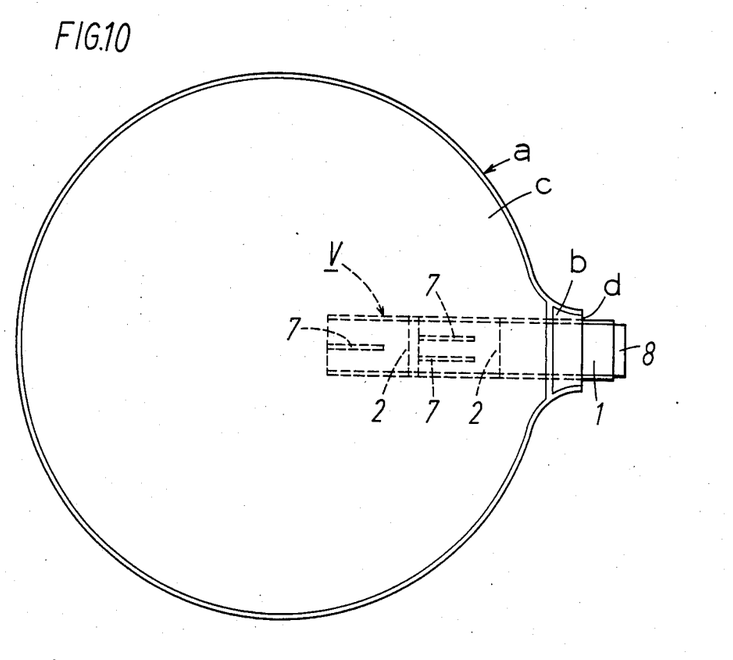
FIG. 10 is a front view illustrating one example of how the check valve of FIG. 8 is used.
Figure 11:
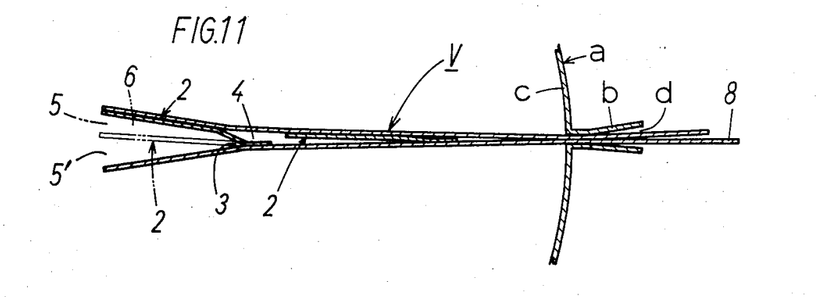
FIG. 11 is a view illustrating how the check valve effects a closing operation.

The check valve V of the second embodiment can be used in a balloon toy body a as shown in FIGS. 10 and 11. Since each of the valve bodies 2 has at its tip a closed portion 3 which forms a dead end, gas once introduced in the balloon toy which tends to flow out, expands the valve body 2 at the base side thereof by the pressure of the gas. The gaps 6 are therefore closed to prevent the gas from flowing out from the balloon toy. At this time, even if a portion of the gas passes through the gaps 6, the other valve body 2 prevents such portion of the gas from flowing out. Together with the provision of a plurality of bonding portions 7, such structure further prevents securely the gas in the balloon toy from flowing out.

Figure 12A:
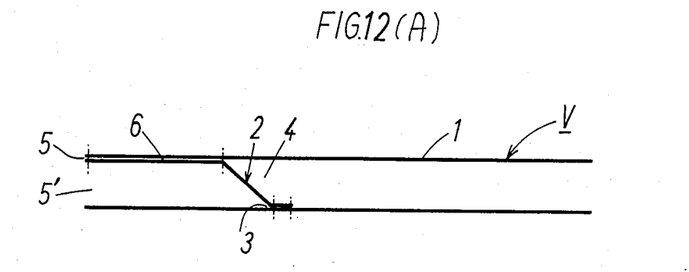
Figure 12B:
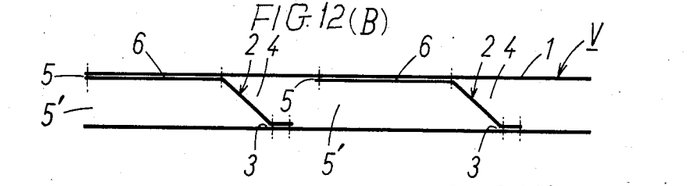
Figure 12C:
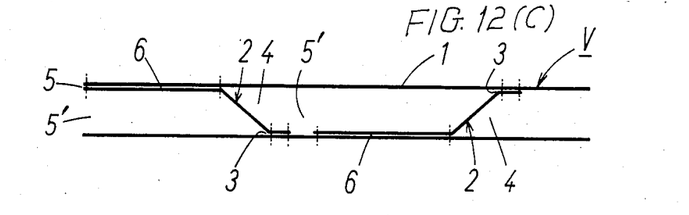

In FIG. 12 (C) illustrates a third embodiment of the present invention, wherein two valve bodies 2 are disposed in series at a predetermined space interval in one fluid pipe 1. The tip end of one valve body is bonded to the lower surface of the fluid pipe 1 in FIG. 12 (C), while the tip end of the other valve body is bonded to the upper surface of the fluid pipe 1 in FIG. 12 (C). Except this point, the third embodiment is substantially the same in structure, operation and effect as in the second embodiment.

Preferred embodiments of the present invention have been discussed and illustrated only by way of example. The present invention is therefore not limited to these embodiments. All modifications and variations of the invention should be included in the invention without departing from the scope of the attached claims.

What is claimed is:

1. A check valve comprising a fluid pipe of a plastic film formed in a flat shape, and at least one valve body of a rectangular plastic film disposed in said fluid pipe,
   said valve body being bonded at the longitudinal edges thereof to the longitudinal edges of said fluid pipe,
   the tip end of said valve body in the fluid flowing direction being bonded to the inner side of one of the upper and lower flat surfaces of said fluid pipe to form a closed portion and an open portion,
   the base end of said valve body being not bonded to said fluid pipe to form openings between said valve body and the flat upper and lower surfaces of said fluid pipe,
   whereby a fluid can flow in a gap between one of said openings at the base end of said valve body and said open portion at the tip end thereof.

2. A check valve as set forth in claim 1, wherein one valve body is disposed in the fluid pipe.

3. A check valve as set forth in claim 1, wherein a plurality of valve bodies are disposed in series at a predetermined space interval in the fluid pipe.

4. A check valve as set forth in claim 3, wherein a plurality of valve bodies are disposed in the fluid pipe with all tip ends of said valve bodies bonded to the same upper or lower surface of said fluid pipe.

5. A check valve as set forth in claim 3, wherein a plurality of valve bodies are disposed in the fluid pipe with each of the tip ends of said valve bodies bonded to either upper or lower surface of said fluid pipe as desired.

6. A check valve as set forth in claim 1, wherein a gap between one of the openings at the base end of the valve body and the open portion at the tip end of the valve body is open throughout.

7. A check valve as set forth in claim 1, wherein a gap between one of the openings at the base end of the valve body and the open portion at the tip end of the valve body is partially closed by bonding means.

8. A check valve as set forth in claim 7, wherein the gap between one of the openings at the base end of the valve body and the open portion at the tip end of the valve body is partially closed by one bonding means.

9. A check valve as set forth in claim 7, wherein the gap between one of the openings at the base end of the valve body and the open portion at the tip end of the valve body is partially closed by a plurality of bonding means.

10. A check valve as set forth in claim 1, wherein the fluid pipe has, at the fluid inlet/outlet port thereof, a projecting guide tongue with the use of which a fluid charge/discharge means is inserted.

* * * * *